United States Patent [19]

Murdock et al.

[11] Patent Number: 4,725,695
[45] Date of Patent: Feb. 16, 1988

[54] TOUCH PANEL WITH DISCONTINUITIES IN TOUCH SENSITIVE SURFACE

[75] Inventors: Bruce Murdock, Beaverton; Philip T. Krein; Daniel G. Teichmer, both of Portland, all of Oreg.

[73] Assignee: Tektronix, Inc., Beaverton, Oreg.

[21] Appl. No.: 928,433

[22] Filed: Nov. 10, 1986

[51] Int. Cl.⁴ ............................................. G08C 21/00
[52] U.S. Cl. ...................................................... 178/18
[58] Field of Search .......................... 178/18, 19, 20; 340/706, 718

[56] References Cited

U.S. PATENT DOCUMENTS

| | | | |
|---|---|---|---|
| 3,801,733 | 4/1974 | Bailey | 178/19 |
| 4,055,726 | 10/1977 | Turner et al. | 178/18 |
| 4,186,392 | 1/1980 | Holz | 340/712 |
| 4,198,539 | 4/1980 | Pepper, Jr. | 178/18 |
| 4,214,122 | 7/1980 | Kley | 178/18 |
| 4,353,552 | 10/1982 | Pepper, Jr. | 273/85 |
| 4,442,317 | 4/1984 | Jandrell | 178/18 |
| 4,476,463 | 10/1984 | Ng et al. | 340/712 |
| 4,622,437 | 11/1986 | Bloom et al. | 178/18 |
| 4,625,075 | 11/1986 | Jaeger | 178/18 |

OTHER PUBLICATIONS

Panttaja, E., "Touch Screens Let Your Fingers Provide a Fast, Simple Entry into the Computer," Electronics, Apr. 19, 1984, pp. 140–144.

Primary Examiner—Stafford D. Schreyer
Attorney, Agent, or Firm—John D. Winkelman; David P. Petersen

[57] ABSTRACT

In accordance with the invention, a touch panel includes an electrically conductive film of a first resistivity which extends over a first area of a base plate. Regions of a resistivity higher than the first resistivity, such as discontinuities in the film, are positioned in this first area. These discontinuities are located so as to enhance the uniformity of an electric field which is established in a touch sensing portion of the film.

19 Claims, 8 Drawing Figures

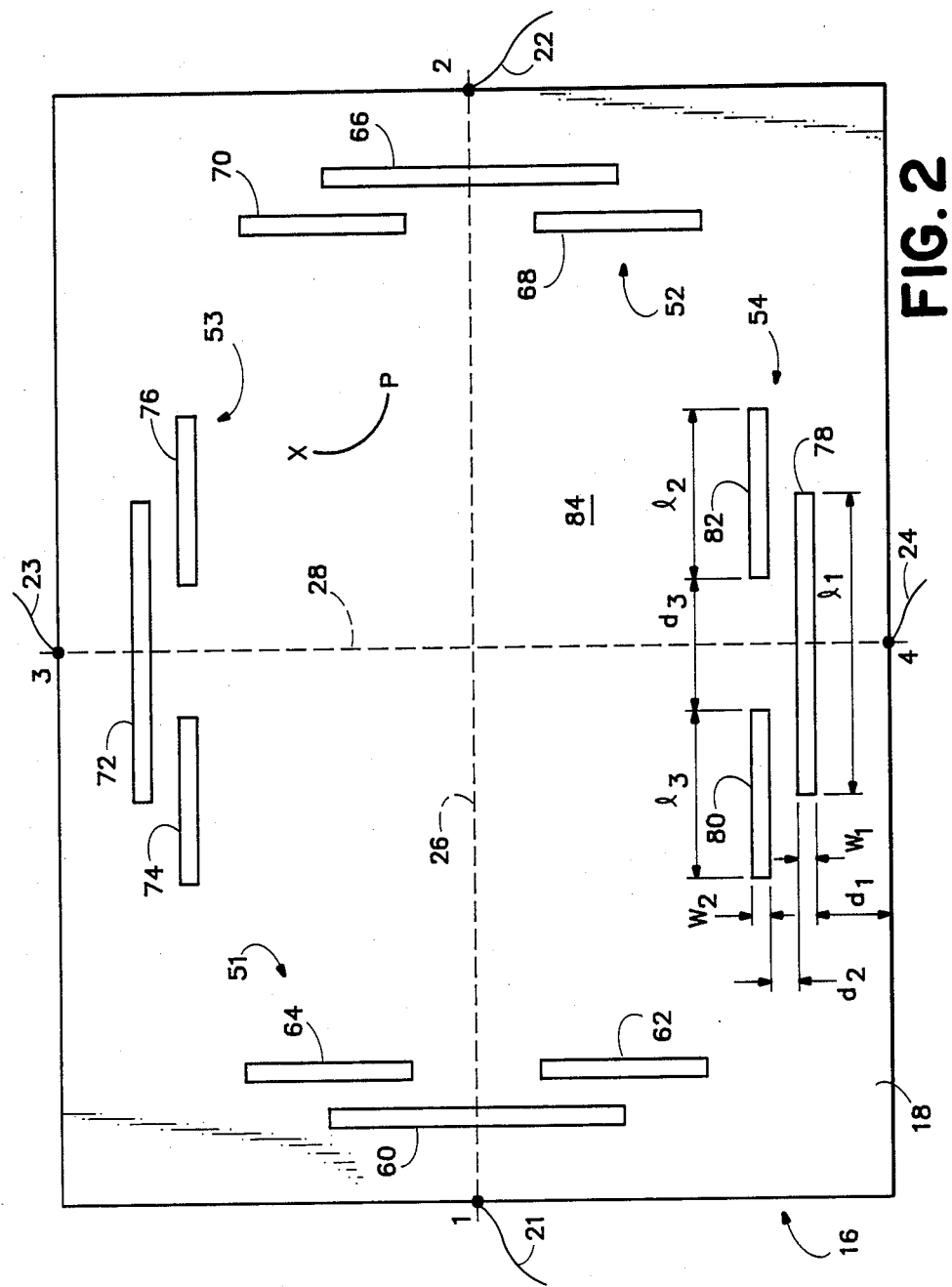

TOUCH PANEL WITH DISCONTINUITIES IN TOUCH SENSITIVE SURFACE

TECHNICAL FIELD

This invention relates to a touch panel having a touch sensing surface with discontinuities therein for enhancing the uniformity of an electric potential gradient established in the touch sensing surface.

The invention may be used with a wide variety of display devices of the type which display information from which a user makes a selection. One example is a lap held tablet in which a user selects and touches the device to, for example, indicate a response to a question. A further example is user selection of information items displayed on the screen of a display terminal, such as a cathode-ray tube (CRT) terminal, which is connected to a computerized information processing system.

Cathode-ray tube display terminals are known which employ a touch panel with a set pattern of touch sections over a terminal display screen. The terminal responds to touch at any section in the prescribed pattern and identifies the location of the touched section. Such system typically employs a capacitive sensing technique. That is, a controller continually transmits a scanning signal across the touch panel and samples the sections until a touch is detected. When one of the sections is touched by a user, the capacitance of the user's body is added to the circuit. The controller senses the resulting change in capacitance and identifies the touched section from this change.

One example of such a touch responsive terminal is manufactured by RGB Dynamics of Salt Lake City, Utah. In the RGB device, a touch sensitive surface is comprised of indium tin oxide which is applied to a glass base plate. The coating is patterned in discrete sections with conductors coupling each section to an electrical detection circuit. Such patterning limits the touch resolution to the size of the patterned sections. Also, touch detection is limited by the particular pattern of sections employed. In addition, a complex wiring arrangement is required to make electrical contact with each of the patterned sections. Such complex connection schemes are more prone to failure and more costly than simpler arrangements.

U.S. Pat. No. 4,476,463 of Ng, et al. discloses a form of capacitive touch detecting device having an electrically conductive touch sensitive coated surface with four electrically conductive elongated bar electrodes connected to the coating. One of these electrodes is provided along each side of the touch sensitive coating and each of these electrodes is connected to a respective connecting wire. As described in this patent, measurements are made of the change in electrical impedance which a capacitive touch introduces to a resistance-capacitance (R-C) circuit which includes the touch sensing surface. The impedance measurement involves an examination of the electrical time constant of the R-C circuit with the measurement being performed repeatedly for each end of two intersecting linear axes. The resultant four measures are combined to determine the position of the touch.

The use of bar electrodes as shown in this Ng, et. al. patent would interfere with applications in which a uniform electric field gradient is desired across the touch sensing surface. For example, assume an electric field is established between a first electrode along one side of the Ng, et. al. touch sensing surface and the electrode at the opposite side of the touch sensing surface. In this case, the electrodes along the other two sides of the Ng, et al. touch sensing surface would interfere with the uniformity of the electric field between the first two electrodes, assuming that the conductivity of the electrodes is greater than that of the film.

Still another touch panel device with a touch sensing surface is disclosed in U.S. Pat. No. 4,353,552 of Pepper, Jr. In the Pepper device, a user touches the touch sensing surface with a finger, other body portion, or an electrically conductive stylus. Plural terminations (i.e. the four corners A, B, C and D) of the touch sensing surface are simultaneously driven to the same instantaneous potential by an oscillator. Pepper utilizes a pattern of electrically conductive segments inlaid or overlaid on a uniform sheet of resistive material. When appropriate voltages are applied to corner terminations, A, B, C and D, Pepper recites that a uniform electric field with controllable amplitude and direction is created on the touch sensing surface. When the sensing surface is touched, currents flow through the driven terminations. The X and Y coordinates of touch are determined from these currents independently of the impedance of the user's touch.

Although Pepper discloses one approach in which four wires, connected to the four corners of a rectangular touch sensing surface, or to three corners of a triangular touch sensing surface in another embodiment, are used in generating a uniform electric field across a touch sensing surface, Pepper suffers from certain deficiencies. For example, the conductive segments along two of the sides of the panel of Pepper would interfere with the establishment of a uniform electric field gradient between the other two sides of the Pepper touch sensing surface. In addition, Pepper requires the manufacturing step of inlaying or overlaying a conductive material on a resistive surface.

Therefore, a need exists for an touch panel with a touch sensing surface which overcomes these and other disadvantages of the prior art.

SUMMARY OF THE INVENTION

A touch panel device according to the present invention minimizes the number of electrical contacts required to establish a uniform electric field gradient across a touch sensing surface of the touch panel. Such a touch sensing surface is useful in a variety of applications, such as in a determining where the panel is touched by a human finger or stylus.

In accordance with the invention, the touch panel includes an electrically conductive film of a first resistivity which extends over a first area of a base plate and which terminates at a boundary. Regions of a resistivity higher than the first resistivity, such as discontinuities in the film, are positioned in this first area so as to enhance the uniformity of an electric field established in the touch sensing portion of the film. Highly uniform fields enhance the use of the touch panel in applications in which touch impedance varies significantly. For example, when user's wear gloves at times and do not wear them at other times. Also, with a uniform field the sensed touch signal varies linearly with touch location, thereby facilitating signal processing.

In a typical example, first and second electrical contacts are positioned in the film along an X axis and third and fourth electrical contacts are positioned in the film along a Y axis. Four sets of at least one elongated discontinuity are provided with each such set being associated with, and positioned adjacent to, a respective one of the contacts. These discontinuities modify the electric field established by a signal applied to the first and second contacts so as to reduce the distance between such contacts and the locations along the X axis from the contacts at which the electrical field has equal potential lines substantially normal to the X axis. In the same manner, the sets of discontinuities associated with the third and fourth contacts modify the electric field established by a signal applied to the third and fourth contacts so as to reduce the distance from such contacts to the locations along the Y axis at which the electric field has equal potential lines substantially normal to the Y axis.

In a more specific form of the invention, the discontinuities comprise elongated slits with the slits associated with the first and second contacts being symmetric about the X axis and the slits associated with the third and fourth contacts being symmetric about the Y axis.

As another specific example, each set of discontinuities comprises a first row of a single slit, a second row of two slits parallel to the first row, and a third row of either two or four slits.

As a further specific example, each set of discontinuities comprises a single row of plural slits which are progressively spaced further apart moving along the row away from the associated contact. Equivalently, the slits in each row may be equally spaced apart, but of progressively increasing length moving from the outer edges of the row and toward the associated contact.

It is accordingly one object of the present invention to provide a touch sensing surface in which the uniformity of an electric field gradient across the surface is enhanced while the number of electrical contacts required to establish such a field is minimized.

A further object of the present invention is to provide a touch panel in which the uniformity of the electric field gradient a first direction is substantially unaffected by means used to establish a uniform electric field gradient in an orthogonal direction, and vice versa.

Still another object of the present invention to provide a touch sensing surface which is relatively easy and inexpensive to manufacture.

These and other objects of the present invention will become more apparent with reference to the following description and drawings.

BRIEF DESCRIPTION OF THE DRAWINGS

FIG. 2 is a front elevational view of the touch panel of FIG. 1;

DETAILED DESCRIPTION OF THE PREFERRED EMBODIMENTS

Figure 1:
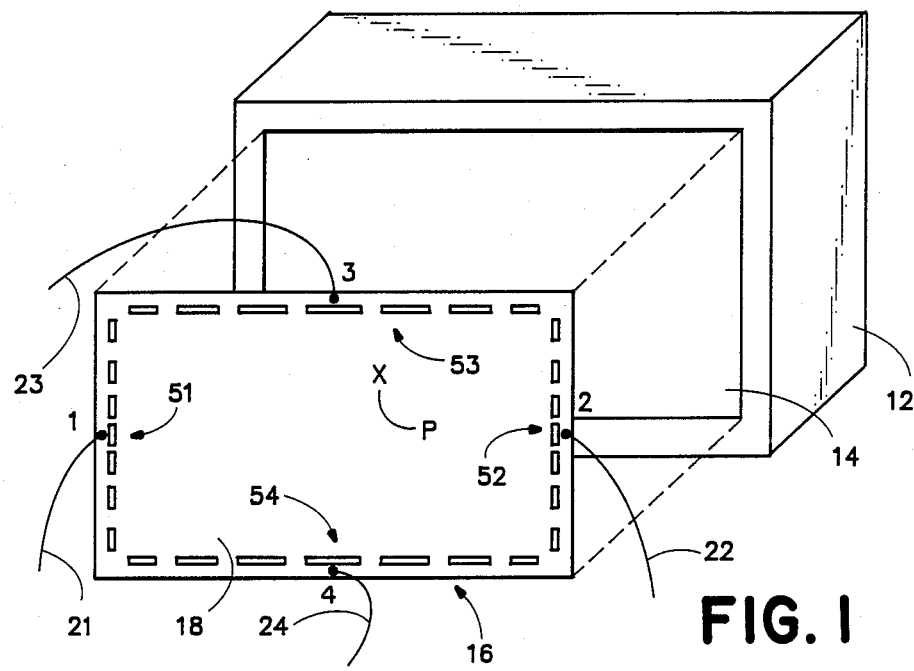
FIG. 1 is an isometric view of one embodiment of a touch panel device in accordance with the present invention.

As shown in FIG. 1, a touch panel device in accordance with the invention has a display unit 12 with a display screen 14. The illustrated display unit comprises a cathode-ray tube computer terminal and accordingly the display screen 14 comprises the face of the cathode-ray tube. An optically-transparent touch panel 16 is positioned to overlay the screen 14 so that the screen is visible through the touch panel. By optically transparent, it is meant that it is possible to perceive images on screen 14 through the touch panel 16. In other applications, the display unit 12 is eliminated. For example, an information containing sheet of paper, such as a question and answer sheet, may be positioned under the touch panel 16 with the touch panel being utilized to enter data relating to the question and answer sheet. Also, in certain applications, the touch panel 16 need not be transparent. For example, the touch panel may simply be used as a data entry pad with the location touched causing entry of data into a computer or other device.

The touch panel 16 has a base plate, which may be of glass or other optically transmissive material, with an electrically-conductive coating or film 18 over its outer surface. The base plate has a lower conductivity than film 18. The coating 18 may cover the entire display 14 when the touch panel is in place, or whatever portion of the screen 14 that is used to display user-selectible items.

As shown in FIGS. 1 and 2, the coating 18 comprises a touch sensitive or sensing surface with plural electrical contacts, in this case four such contacts 1-4, in electrical contact with the coating. Only four electrical conductors, 21-24, each connected to a respective one of the contacts 1-4, are required to couple the touch panel to the remaining electronics of the touch panel device. Consequently, extensive and complex wiring assemblies for coupling signal processing electronics to a touch panel are not needed. Yet, as explained in greater detail below, a touch sensing surface in accordance with the invention enhances the uniformity of an electric field gradient established across the touch sensing surface between the first and second and between the third and fourth pairs of contacts.

Although other configurations are suitable, in the FIGS. 1 and 2 embodiment, the base plate has a generally rectangular shaped coating 18 having respective sides to which the contacts 1-4 are respectively connected. Each of these contacts is located at a position intermediate to, and more specifically mid-way between, the corners of the surface 18. The contacts may comprise air dried silver contact paint spots, to which the conductors are connected. To provide strain relief, the portion of each of these conductors adjacent its associated contact is secured, as by epoxy, to the edge of the touch panel base plate.

With this construction, the contacts 1,2 are at the opposite horizontally separated peripheral side edges of the touch panel. The other contacts 3,4 are vertically spaced apart at opposite peripheral side edges of the touch panel. In addition, the first and second contacts are typically in a line 26 while the third and fourth contacts are in a line 28 which is perpendicular to line 26. Together the two lines 26, 28 provide a reference or cartesion coordinate system. Thus, for purposes of this description, line 16 comprises the X axis of this system and line 28 comprises the Y axis. Touch locations are determined relative to this coordinate system.

More specifically, the touch panel illustrated in FIG. 2 utilizes the two pairs of opposed sets of contacts 1,2 and 3,4 in determining the touch location relative to the two directions across the touch sensing surface. In addition, only one pair of opposed contacts is used if a single direction touch location determination is to be made. That is, contacts 1 and 2 are used in determining touch location in the first or X direction. In addition, contacts 3 and 4 are used to determine touch location in the second or Y direction.

In general, a signal source (not shown) generates an alternating current voltage touch panel scanning signal. The scanning signal is selectively applied to the first and second or third and fourth contacts to establish alternating current voltage gradients in the desired directions across the touch sensing surface. For example, with contacts 3 and 4 open, lead 21 and thus contact 1 may be connected to one output of an alternating current voltage source. Simultaneously, lead 22, and thus contact 2, may be connected to another output of this source which is 180 degrees out of phase from the first output. Therefore, an alternating current gradient is established across the touch sensing surface between the contacts 1 and 2. Similarly, with contacts 1 and 2 open and the two alternating current voltage source outputs connected to contacts 3 and 4, an alternating current voltage gradient is established across the touch sensing surface between the third and fourth contacts. By repeatedly scanning the panel in the X and Y directions and by monitoring the resulting touch currents, the location of touch, for example, point P in FIGS. 1 and 2, can be determined. The above example describes the use of the touch panel in a TEKTOUCH brand touch panel device which is commercially available from Tektronix, Inc. of Beaverton, Oreg. Of course, the touch panel of the invention is not limited to this specific application as it is useful in any application in which it is desirable to establish a uniform alternating current voltage gradient across an electrically conductive touch sensing surface.

Again referring to FIG. 2, the touch panel 16 has a touch sensing surface 18 which extends across the area thereof which, in conjunction with a location determination circuit, is used to sense touch by user. As previously mentioned, the touch panel 16 includes a base plate coated on a surface 18 with an electrically conductive film. One suitable example of such a film is indium tin oxide (10% indium, 90% tin oxide) having a sheet resistivity of 200 ohms per square and a transmission of 85% for light at 520 nanometers. Such plates are commercially available, such as from Optical Coating Laboratory (OCLI) of Santa Rosa, Calif. The sheet resistivity of the film is not highly critical, with resistivities of 200 to 2,000 ohms per square or higher being suitable. However, sheet resistivities of significantly below 200 ohms per square tend to require panel scanning signals of larger than desired magnitudes.

The base plate is not limited to any particular shape. Thus, it may be circular, concave, spherical, curved or flat to fit screen 14. In addition, the base plate may be opaque or optically transparent and of a variety of suitable materials. To reduce glare from reflected light from background sources, the base plate may be of a commercially available anti-glare glass. This glass may also be flat or contoured to match the curvature of the display screen. One source of such base plates is Eagle Convex Glass Co. of Charlesburg, W.V.

As shown in FIGS. 1 and 2, means 51 through 54, associated with the respective contacts 1-4, are provided for modifying the electric field established in the film 18 when the alternating current scanning signals are applied to contacts 1, 2 and 3, 4. Each of these means comprises at least one region having a resistivity higher than the resistivity of the film 18. In addition, this region is positioned in the area of the film at a location spaced from the associated contact and from the boundary of the film. Typically, each of these means comprises at least one elongated region, such as a slit or discontinuity formed in the film which, in essence, is of substantially infinite resistivity. These slits may be formed by grinding the film 18 or by any other suitable process. Alternately, rather than being voids in the film, the regions may comprise areas of a much higher resistivity than the surrounding film.

In the embodiment shown in FIG. 2, means 51 includes a first elongated slit 60 oriented so as to be normal to, and symmetric with, the line 26. Slit 60 is parallel to the side edge of the film 18, and spaced from the boundary of the film. In addition, means 51 also includes a second row of two slits 62, 64 which are in a row or line normal to the X axis 26 and spaced from the slit 60. Slits 62 and 64 are also positioned to be symmetric about the X axis 26. The means 52 comprises a similar set of three slits designated 66, 68 and 70. Likewise, means 53 includes slits 72, 74 and 76 which are in lines or rows normal to and symmetric about the Y axis 28. Furthermore, means 54 includes slits 78, 80 and 82 which are also arranged in rows normal to the line 28 and are symmetric about this line. The sets of slits 51 through 54 define a touch sensing surface 84 therebetween.

Figure 3:
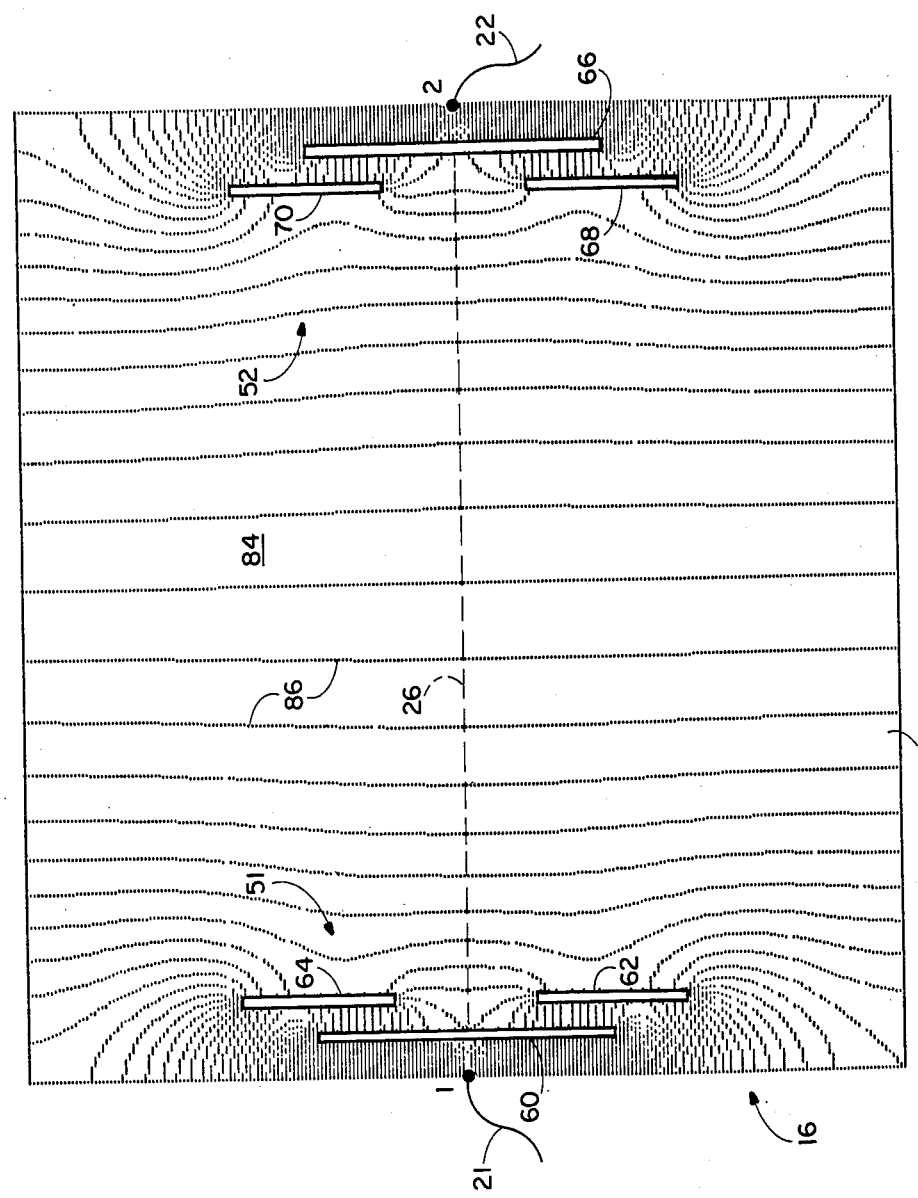
FIG. 3 is a computer generated model of equal potential lines of an electric field established in a touch panel of FIG. 1 in response to an electric signal applied to two opposing contacts of the panel.

Assume that an alternating current voltage scanning signal is applied to contacts 1 and 2. This establishes an alternating current voltage gradient in the film 84 between the two contacts. This electric field will have equal potential lines distributed throughout the film. Assume that, at a given instant in time, a positive 1 volt alternating current voltage signal is applied to contact 1 and the 180 degree phase shifted negative 1 volt alternating current voltage signal is applied to contact 2. FIG. 3 illustrates the resulting electric field. Equal potential lines of this field are designated as 86. As can be seen from FIG. 3, these equal potential lines 86 become substantially normal to the X axis 26 at only a short distance from the rows containing slits 62, 64 and 68, 70. This distance is actually shorter than shown in this figure. Consequently, in applications in which the accuracy of touch location determination is affected by the uniformity of the alternating current voltage gradient in an X direction across the touch sensing surface, the sets of slits 51, 52 enhance this uniformity. It should be noted that the spacing between the slits and between the ends of the slits and the panel edges is highly exaggerated in FIGS. 1 and 2.

Figure 7:
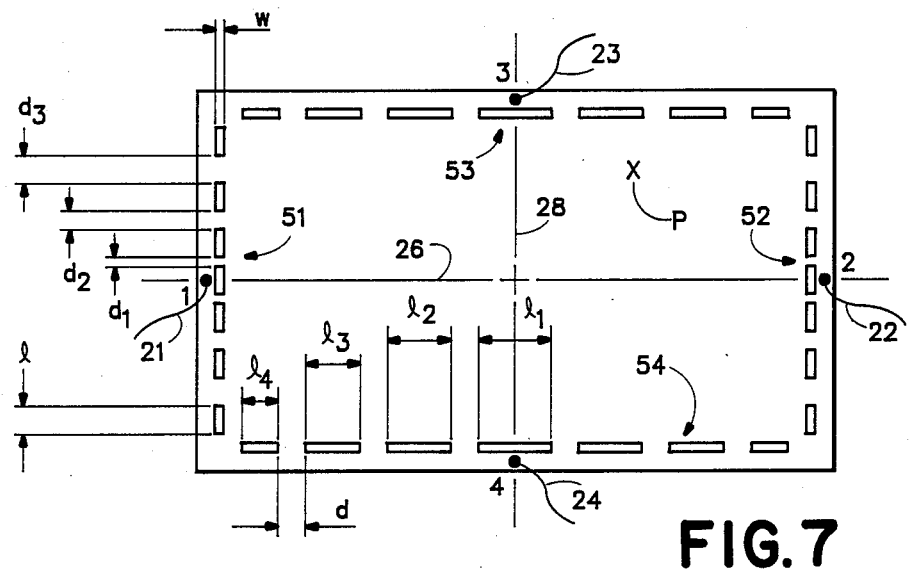
FIG. 7 is a front elevational view of another form of touch panel in accordance with the invention.

This is further shown by comparing FIG. 3 with FIG. 7. In FIG. 7, the same alternating current voltage signal is applied to the contacts 1 and 2. However, the sets of slits 51 and 52 are eliminated from the FIG. 7 example. In this case, the relaxation distance in the FIG. 7 example is much greater than in the FIG. 3 example. The relaxation distance is the distance from contact 1 to the location along line 26 at which the equal potential lines 86 are substantially normal to line 26. The relaxation distance is also equal to the distance from contact 2 to the location along line 26 at which the equal potential lines 86 are substantially normal to this line. In comparing FIGS. 3 and 7, it is readily apparent that the relaxation distance in FIG. 3 is much less than the relaxation distance in FIG. 7. Consequently, the usable area of the touch sensing surface 84, that is, the area in which equal potential lines are substantially normal to line 26, is much greater in the FIG. 3 example than in the FIG. 7 example.

When the alternating current voltage signal is applied to contacts 3 and 4, instead of contacts 1 and 2, the results are like those shown in FIG. 3, except that the equal potential lines 86 become normal to the Y axis 28.

It has been found that the exact positioning of the slits of sets 51 through 54 and the number of slits included in these sets can be varied while still achieving satisfactory results. However, in the specific FIG. 2 example, the area 18 is rectangular and has a boundary which is 80 units along its top and bottom edges and 60 units along its sides. The slit 78 is a distance d1 from the adjacent edge of film 18, d1 being approximately 5 units. In addition, the length l1 of the slit 78 is approximately 21 units. Moreover, the length l3, l2 of slits 80, 82 are each approximately 12 units. Also, slits 80, 82 are spaced apart a distance d3 which is approximately 10 units. In addition, the distance d2, between the slits 80, 82 and slit 78, is approximately 2 units. Finally, the widths w1, w2 of the slits are not critical but are substantially less than the length of these slits. For example, the slits may be much less than one unit wide. Since the slits can be very narrow and rows of slits can be closely spaced, the sets of slits have a minimal effect on electrical fields which are normal to the rows. Similar dimensions are suitable for the sets of slits 51, 52 and 53.

Figure 4:
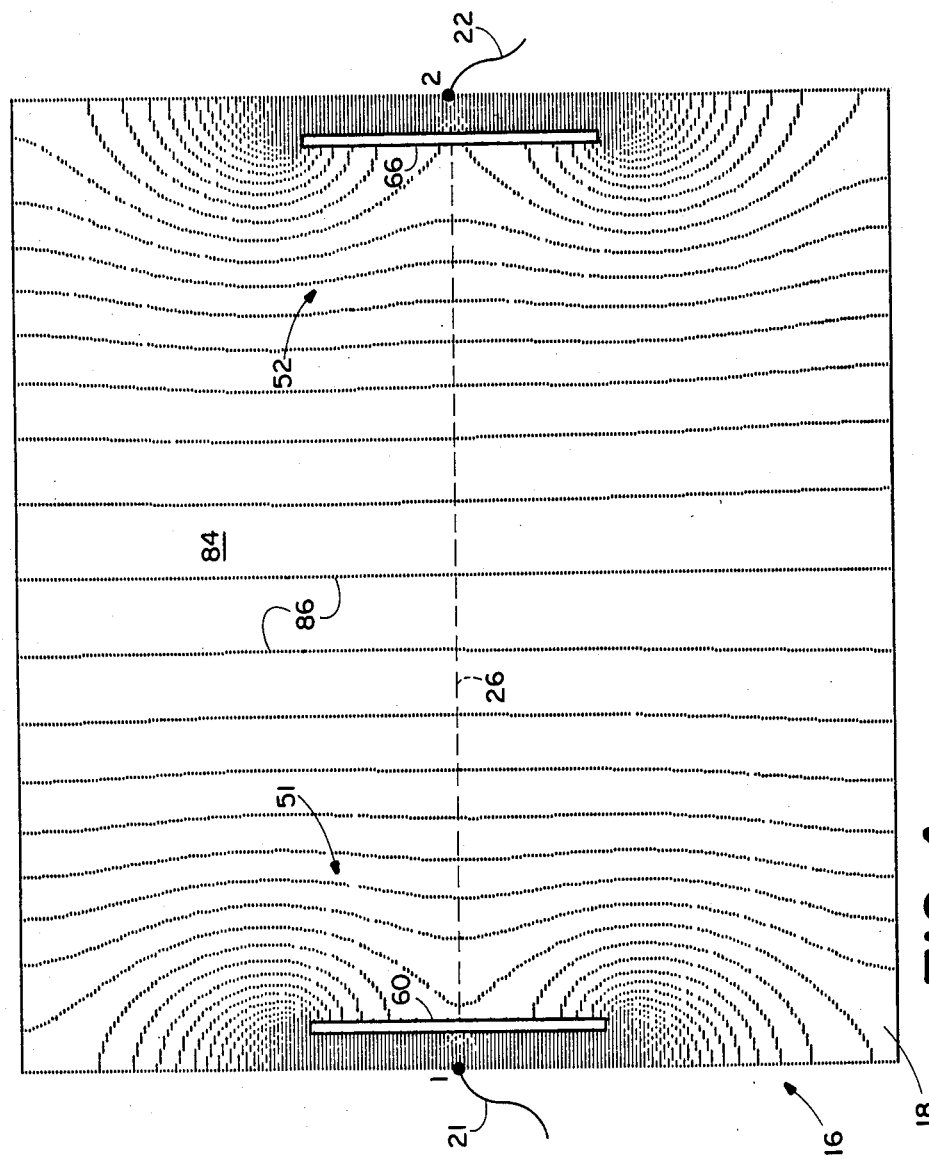
FIG. 4 is a computer generated model of equal potential lines of an electric field established in a touch panel in accordance with another embodiment of the invention in response to an electric signal applied to two opposing contacts of the panel.

To illustrate the versatility of the invention, in FIG. 4 the sets of slits 51 and 52 have been modified to comprise only the respective single elongated slits 60, 66. Again, both of these slits 60, 66 are normal to the line 26. By comparing the equal potential lines in FIGS. 3 and 4, it can be seen that in each case the relaxation distance is substantially reduced in comparison to the FIG. 7 example. Furthermore, each of these contacting configurations is suitable for use in a touch sensing surface. Although the configuration of FIG. 3 does have a shorter relaxation distance than the FIG. 4 form of the invention, because of the fewer number of slits involved, the FIG. 4 embodiment is somewhat easier to manufacture.

Figure 5:
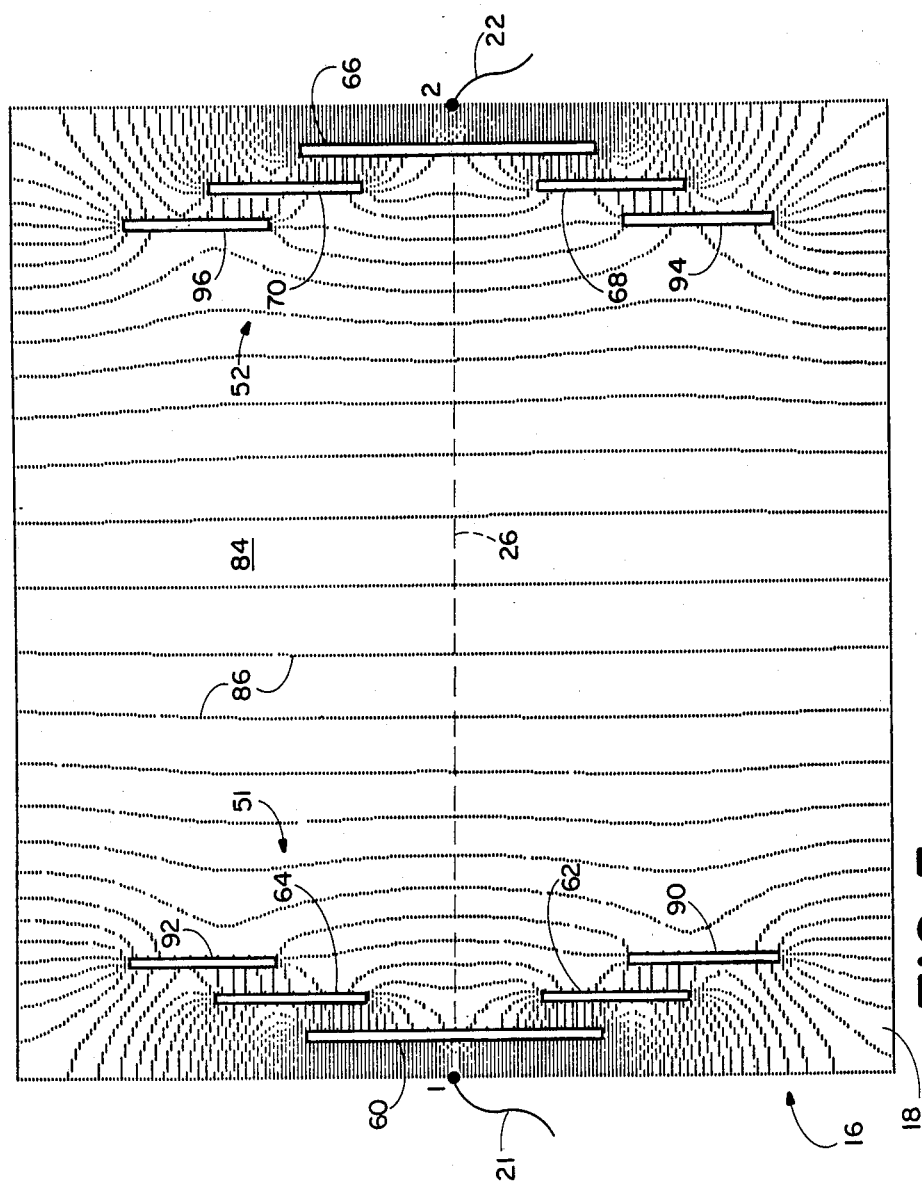
FIG. 5 is a computer generated model of equal potential lines of an electric field established in still another touch panel in accordance with the invention in response to an applied electric signal.
Figure 6:
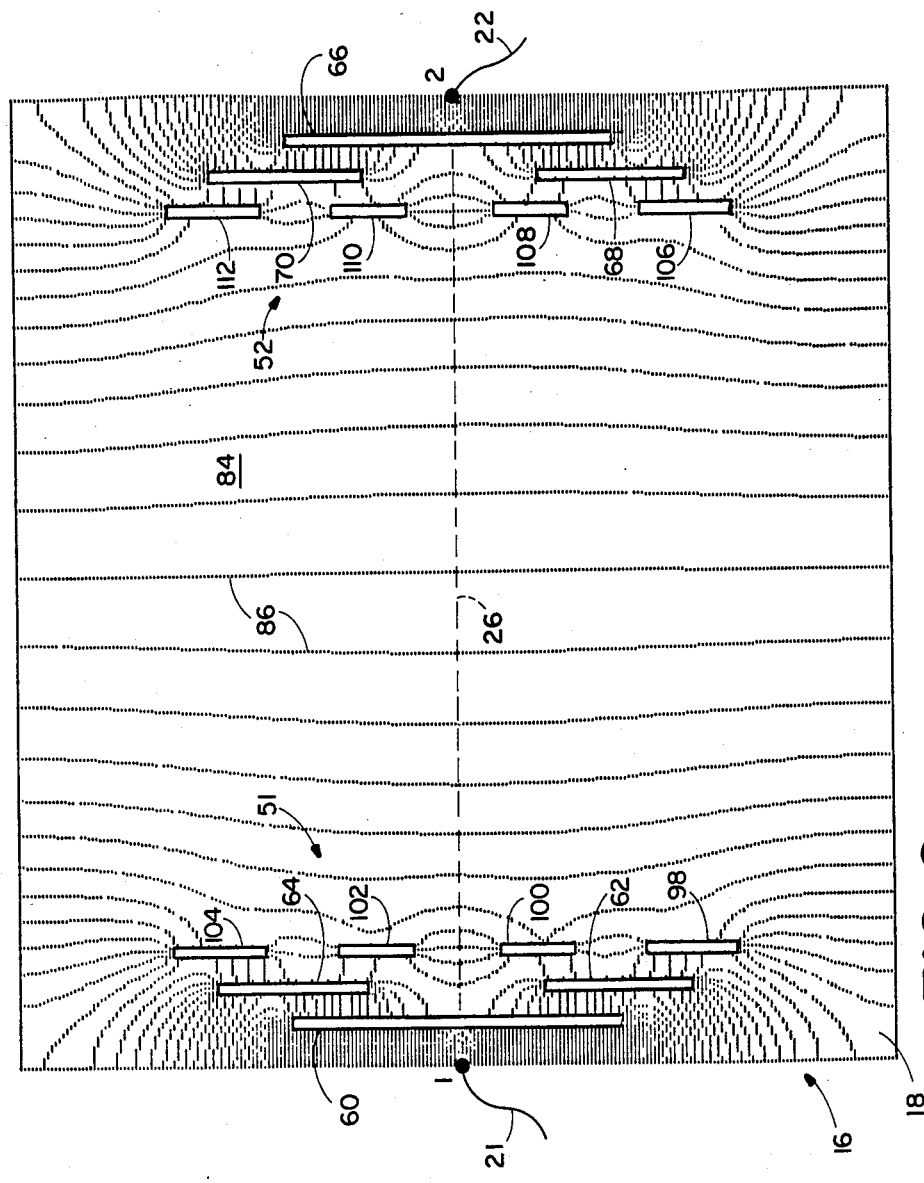
FIG. 6 is a computer generated model of equal potential lines of an electric field established in a further embodiment of a touch panel in accordance with the invention in response to an applied electric signal.
Figure 8:
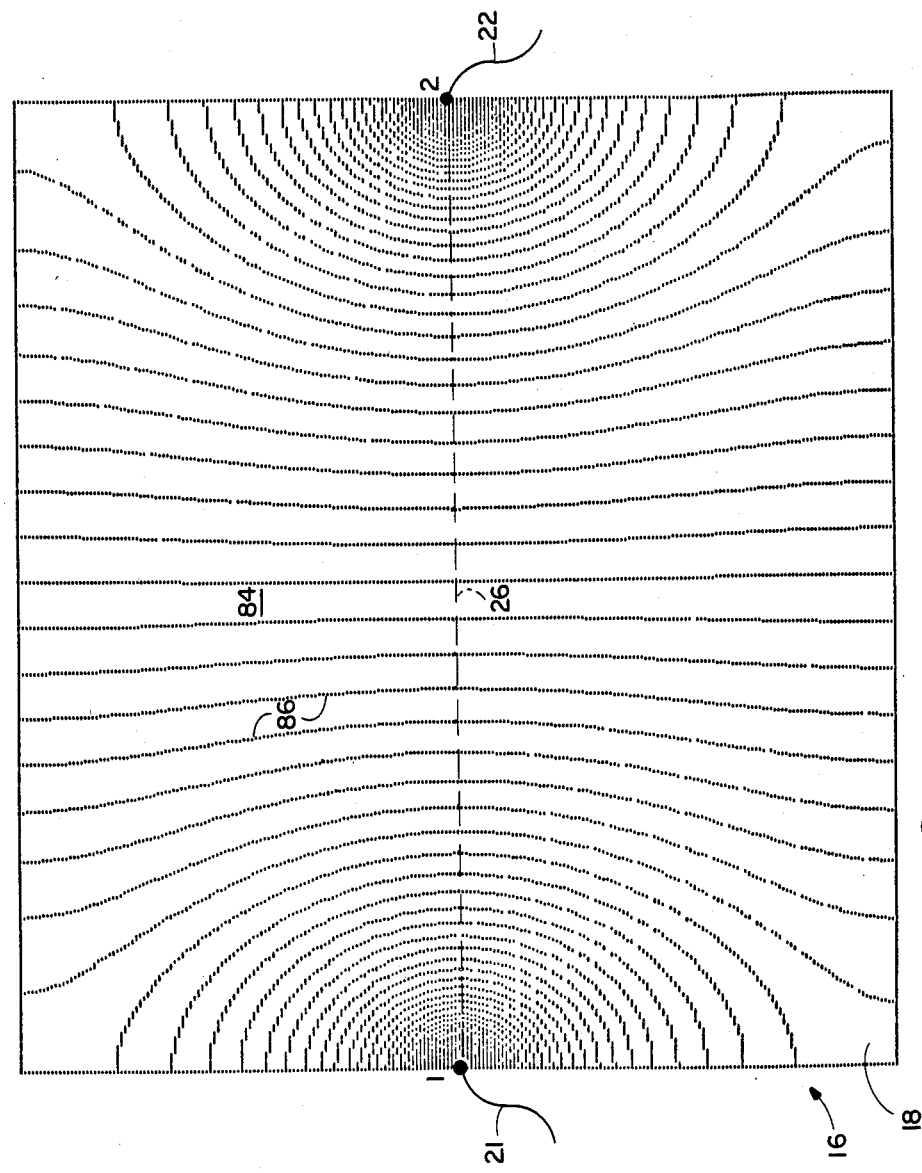
FIG. 8 is a computer generated model of equal potential lines produced when two point contacts are used to apply an electric signal to a touch sensing surface which does not have any discontinuities.

In the FIGS. 5 and 6 forms of the invention, each of the sets 51 and 52 is provided with an additional row of slits. Therefore, each set 51, 52 is comprised of three parallel rows of slits arranged symmetrically about the line 26. In the FIG. 5 embodiment, two slits or discontinuities 90, 92 are provided in the third row of set 51 while two similar slits 94, 96 are included within the third row of set 52. In comparison, the third row of the FIG. 6 set 51 includes four discontinuities or slits 98–104. Also, the third row of the FIG. 6 set 52 includes four slits 106–112. When the equal potential lines 86 of FIGS. 5 and 6 are compared with FIG. 7, it is apparent that these forms of the invention also substantially reduce the relaxation distances in comparison to the case where discontinuities are not present. In addition, the FIGS. 5 and 6 forms of the invention do not significantly improve the results obtained from either the FIGS. 3 or 4 forms. Consequently, although the FIGS. 5 and 6 embodiments are certainly suitable, typically the FIGS. 3 and 4 forms of the invention are preferred. Again, for two direction location determination, similar sets 53, 54 are provided.

In the FIG. 7 form of the invention, the sets of slits 51, 52, 53 and 54 each comprise a single row of spaced apart slits. Sets 51, 52 comprise slits of the same length which are spaced apart a progressively increasing distance moving along the row from the associated contacts 1, 2. That is, distances d1, d2 and d3 are of a progressively increasing magnitude. Sets 53, 54 comprise slits which are spaced apart a constant distance d, but which are of a progressively increasing length moving from the slits at the outer ends of the rows to the center of the row. That is, l4, l3, l2 and l1 are of progressively increasing length. These sets 51, 52 and 53, 54 have a similar effect on the elective field gradient across the touch sensing surface. Therefore, they may be interchanged as desired. In addition, because sets 51, 52, 53 and 54 are formed of slits in single rows, the sets can be readily formed in film 18. For example, by using a single grinding wheel that is touched to the film where each slit in a row is to be formed as the panel passes the wheel.

Having illustrated the invention with reference to several preferred embodiments, it should be apparent to those skilled in the art that our invention may be modified in arrangement and detail without departing from such principles. We claim as our invention all such modifications as come within the true spirit and scope of the following claims.

We claim:

1. A touch panel with a touch sensing surface in which an electric field is established by applying an electric signal to first and second contacts located on a line across the touch sensing surface comprising:
   a base plate;
   an electrically conductive film of a first electrical resistivity, the film extending over a first area of the base plate and terminating at a boundary;
   a first means comprising a first elongated region with a first longitudinal axis and which is of a resistivity higher than the first resistivity, the first region being positioned in the first area at a location which is spaced from the boundary;
   a second means comprising a second elongated region with a second longitudinal axis and which is of an electrical resistivity higher than the first resistivity, the second region being positioned in the first area at a location spaced from the boundary and spaced from the first region, the touch sensing surface being located between the first and second regions and the first longitudinal axis being generally parallel to the second longitudinal axis;
   the first means comprising means for modifying the electric field established by the electric signal so as to reduce the distance from the first contact to the location along the line between the contacts at which the electrical field has equipotential lines substantially normal to the line between the contacts; and the second means comprising means for modifying the electric field established by the electrical signal so as to reduce the distance from the second contact to the location along the line between the contacts at which the electrical field has equipotential lines substantially normal to the line between the contacts.

2. A touch panel according to claim 1 in which the first and second regions comprise discontinuities in the film.

3. A touch panel with a touch sensing surface in which an electric field is established by applying an electric signal to first and second contacts located on a line across the touch sensing surface comprising:
   a base plate;
   an electrically conductive film of a first electrical resistivity, the film extending over a first area of the base plate and terminating at a boundary;
   a first means comprising a first region of a resistivity higher than the first resistivity, the first region being positioned in the first area at a location which is spaced from the boundary;
   a second means comprising a second region of an electrical resistivity higher than the first resistivity, the second region being positioned in the first area at a location spaced from the boundary and spaced from the first region, the touch sensing surface being located between the first and second regions;
   the first means comprising means for modifying the electric field established by the electrical signal so as to reduce the distance from the first contact to the location along the line between the contacts at which the electric field has equipotential lines substantially normal to the line between the contacts; and
   the second means comprising means for modifying the electric field established by the electric signal so as to reduce the distance from the second contact to the location along the line between the contacts at which the electric field has equipotential lines substantially normal to the line between the contacts and in which the first region comprises a first elongated slit in the film and the second region comprises a second elongated slit in the film.

4. A touch panel according to claim 3 in which the first and second slits are parallel to one another and normal to a line which intersects the first and second slits.

5. A touch panel according to claim 3 in which the first and second regions comprise respective first and second rows of plural slits which extend in a direction normal to the line between the contacts, the slits of the first region being of a common length and being spaced apart a progressively increasing distance moving along the first row away from the first contact, the slits of the second region being of a common length and being spaced apart a progressively increasing distance moving along the second row away from the second contact.

6. A touch panel according to claim 3 in which the first and second regions comprise respective first and second rows of plural slits which extend in a direction normal to the line between the contacts, the slits of the first region being spaced apart a common distance and being of a progressively increasing length moving toward the center of the first row from the outer ends of the first row, the slits of the second region being spaced apart a common distance and being of a progressively increasing length moving toward the center of the second row from the outer ends of the second row.

7. A touch panel according to claim 4 including a first row of at least two elongated spaced apart slits parallel to and spaced from the first slit and from the second slit, a second row of at least two elongated spaced apart slits parallel to the second slit and positioned between the second slit and first row, the touch sensing surface being between the first and second rows.

8. A touch panel according to claim 7 in which the first and second slits and first and second rows of slits are symmetric about the line which intersects the first and second slits.

9. A touch panel according to claim 8 in which the first area is rectangular with a boundary which is eighty units along first and second sides, the first and second sides being normal to the line which intersects the first and second slits, the boundary being sixty units along third and fourth sides parallel to the line which intersects the first and second slits, the first slit being approximately five units from the first side and approximately twenty-one units long, the first row having two slits which are each approximately twelve units long and which are approximately ten units apart, the first row being spaced approximately two units from the first slit, the second slit being approximately five units from the second side and approximately twenty units long, the second row having two slits which are each approximately twelve units long and which are approximately ten units apart, and the second row being approximately two units from the second slit.

10. A touch panel according to claim 7 including a third row of plural elongated spaced apart slits parallel to the first slit and positioned between the first and second rows, the touch panel also including a fourth row of plural elongated spaced apart slits parallel to the second slit and positioned between the second and third rows, the touch sensing surface being between the third and fourth rows.

11. A touch panel with a touch sensing surface comprising:
    a base plate;
    an electrically conductive film extending over a first area of the base plate and terminating at a boundary;
    a first elongated slit spaced from the boundary and positioned in a first line;
    a second elongated slit spaced from the boundary and the first slit, the second slit being positioned in a second line parallel to the first line;
    a third elongated slit spaced from the boundary and positioned in a third line which is normal to the first line and which does not intersect the first and second slits; and
    a fourth elongated slit spaced from the boundary and positioned in a fourth line which is parallel to and spaced from the third line and which does not intersect the first and second slits, the touch sensing surface being between the first, second, third and fourth lines.

12. A touch panel according to claim 11 including first, second, third and fourth rows of at least two slits, the first and second rows of slits being spaced apart and parallel to one another and to the first and second lines, the third and fourth rows of slits being spaced apart and parallel to one another and to the third and fourth lines, the touch sensing surface being between the first, second, third and fourth rows.

13. A touch panel according to claim 12 including at least one additional pair of rows of plural spaced apart slits parallel to the first row of slits and positioned between the first and second rows, and at least one additional pair of rows of plural spaced apart slits parallel to the third row of slits and positioned between the third and fourth rows, the touch sensing surface being between such additional rows.

14. A touch panel according to claim 12 in which all of the slits which are parallel to the first line are symmetric about an X axis line which is normal to the first line, and in which all of the slits which are parallel to the third line are symmetric about a Y axis line which is normal to the third line, the X and Y axis lines defining an X-Y coordinate system.

15. In a touch panel device having a touch sensing surface formed of an electrically conductive film, first and second electrical contacts electrically connected to the film and spaced apart across the film in a first line from one another, whereby a first electric field is established in the film in response to a first electrical signal applied to the first and second contacts, third and fourth electrical contacts electrically connected to the film and spaced apart across the film from one another in a second line from one another, whereby a second electric field is established in the film in response to a second electrical signal applied to the third and fourth contacts, the improvement comprising:

first slit means positioned between the first and second contacts for modifying the first electric field so that the relaxation distance between the first contact and the position along the first line from the first contact at which the field has equipotential lines which are substantially normal to the first line is less than the relaxation distance in absense of such first slit means;

second slit means positioned between the first and second contacts for modifying the first electric field so that the relaxation distance between the second contact and the position along the first line from the second contact at which the field has equipotential lines which are substantially normal to the first line is less than the relaxation distance in absense of such second slit means;

third slit means positioned between the third and fourth contacts for modifying the second electric field so that the relaxation distance between the third contact and the position along the second line from the third contact at which the field has equipotential lines which are substantially normal to the second line is less than the relaxation distance in absense of such third slit means;

fourth slit means positioned between the third and fourth contacts and spaced from the third slit means for modifying the second electric field so that the relaxation distance between the fourth contact and the position along the second line from the fourth contact at which the field has equipotential lines which are substantially normal to the second line is less than the relaxation distance in absense of such fourth slit means.

16. An apparatus according to claim 15 in which the first slit means includes a first elongated slit normal to and symmetric about the first line, the second slit means includes a second elongated slit normal to and symmetric about the first line, the third slit means includes a third elongated slit normal to and symmetric about the second line, and the fourth slit means includes a fourth elongated slit normal to and symmetric about the second line.

17. An apparatus according to claim 16 in which the first slit means includes a first row of at least two elongated slits parallel to and spaced from the first elongated slit, the second slit means includes a second row of at least two elongated slits parallel to and spaced from the second elongated slit, the third slit means includes a third row of at least two elongated slits parallel to and spaced from the third elongated slit, and the fourth slit means includes a fourth row of at least two elongated slits parallel to and spaced from the fourth elongated slit.

18. An apparatus according to claim 16 in which at least two of the first, second, third and fourth slit means comprise respective first and second rows of plural slits, the slits of the first region being of a common length and being spaced apart a progressively increasing distance moving along the first row away from the first contact, the slits of the second region being of a common length and being spaced apart a progressively increasing distance moving along the second row away from the second contact.

19. An apparatus according to claim 16 in which at least two of the first, second, third and fourth slit means comprise respective first and second rows of plural slits, the slits of the first region being spaced apart a common distance and being of a progressively increasing length moving toward the center of the first row from the outer ends of the first row, the slits of the second region being spaced apart a common distance and being of a progressively increasing length moving toward the center of the second row from the outer ends of the second row.

* * * * *